(12) United States Patent
Itoh et al.

(10) Patent No.: US 6,287,683 B1
(45) Date of Patent: Sep. 11, 2001

(54) ANTI-FOGGING COATING AND OPTICAL PART USING THE SAME

(75) Inventors: Susumu Itoh, Tokyo; Shoichi Shimura, Yokohama; Hideyuki Hatakeyama, Kawasaki; Hideo Ukuda, Yokohama, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/055,764

(22) Filed: Apr. 7, 1998

(30) Foreign Application Priority Data

| Apr. 9, 1997 | (JP) | 9-090832 |
| Jul. 8, 1997 | (JP) | 9-182496 |
| Jul. 14, 1997 | (JP) | 9-188293 |

(51) Int. Cl.[7] ............... B32B 7/04; G02B 1/00; G02B 1/11
(52) U.S. Cl. .......... 428/336; 428/213; 428/214; 428/216; 428/312.2; 428/312.6; 428/316.6; 428/318.4; 428/319.1; 428/412; 428/428; 428/448; 428/451
(58) Field of Search ............... 428/213, 214, 428/215, 216, 336, 312.2, 312.6, 316.6, 318.4, 319.3, 412, 428, 429, 448, 447, 451

(56) References Cited

U.S. PATENT DOCUMENTS

| 3,895,155 | 7/1975 | Shukuri et al. | 428/206 |
| 5,404,073 | 4/1995 | Tong et al. | 313/479 |
| 5,976,680 | * 11/1999 | Ikemori et al. | 428/212 |

FOREIGN PATENT DOCUMENTS

| 0716051 | 6/1996 | (EP) . |
| 0782015 | 7/1997 | (EP) . |
| 0798272 | 10/1997 | (EP) . |
| 55-110201 | * 8/1980 | (JP) . |
| 96-18918 | 6/1996 | (WO) . |

OTHER PUBLICATIONS

Patent Abstracts of Japan, vol. 11, No. 335 (P–632) 05/87 for JP 62–118301.
Patent Abstracts of Japan, vol. 15, No. 184 (P–1200) 02/91 for JP 03–41402.

* cited by examiner

*Primary Examiner*—D. S. Nakarani
(74) *Attorney, Agent, or Firm*—Fitzpatrick, Cella, Harper & Scinto (57) ABSTRACT

Disclosed herein is an anti-fogging coating formed on the surface of an optical substrate, wherein the anti-fogging coating comprises a water-absorbing film and a porous film in the order near to the surface of the substrate.

21 Claims, 5 Drawing Sheets

SPECTRAL CHARACTERISTICS OF
$SiO_2$ FILM FORMED AT $1\times10^{-4}$ torr

FIG. 11

SPECTRAL CHARACTERISTICS OF
$SiO_2$ FILM FORMED AT $5\times10^{-4}$ torr

FIG. 12 SPECTRAL CHARACTERISTICS OF ANTI-FOGGING FILM WITH ANTI-REFLECTION FILM HAVING $MgF_2 + SiO_2$ CONSTITUTION

FIG. 13 SPECTRAL CHARACTERISTICS OF ANTI-FOGGING FILM WITH ANTI-REFLECTION FILM HAVING $ZrO_2 + SiO_2$ CONSTITUTION

ANTI-FOGGING COATING AND OPTICAL PART USING THE SAME

BACKGROUND OF THE INVENTION

1. Field of the Invention

The present invention relates to an anti-fogging coating which can prevent fogging of an optical substrate caused by moisture, and optical parts obtained by applying the anti-fogging coating to optical substrates such as lenses, prisms and mirrors.

2. Related Background Art

The reason why various kinds of optical substrates typified by lenses and mirrors in optical instruments fog up is that moisture in the air adheres thereto in the form of fine waterdrops because their surface humidity is lowered to a dew point or lower, and so light is diffusely reflected. Accordingly, it is considered that the fogging can be prevented by preventing the formation of waterdrops on the surface of the substrate. As such anti-fogging methods, for example, the following four factors have come to be considered. (A) Adjustment of wetting; (B) impartment of water-absorbing property; (C) impartment of water repellency; and (D) adjustment of humidity by heating.

Although various methods have been attempted as yet, all the attempts are insufficient. It is now practiced to adjust humidity of the surface of an optical substrate by heating, thereby producing an anti-fogging effect on lenses of copying machines, rear windshields for automobiles and high-grade dressing tables. However, such a method involves many problems. For example, since a power source is required, its application fields are limited, and accidents such as fires may happen.

In order to offset the above demerits, there have been developed films formed of an anti-fogging coating composition comprising a high water-resistant organic polymer containing a surfactant. This anti-fogging coating composition is so designed that a film made hydrophilic by the surfactant and polyether polyol absorbs moisture to exhibit anti-fogging property, and in the case where the moisture exceeds the critical point of water absorption of this film, wetting is adjusted by the surfactant contained to maintain good transparency. However, since the surfactant easily dissolves in water to run out, the anti-fogging properties and strength of the film are markedly lowered.

There have been further proposed anti-fogging coating films formed mainly of an organic substance having polyvinyl alcohol or a polymer of hydroxyethyl methacrylate as a main component (for example, Japanese Patent Application Laid-Open No. 55-110201). However, such a film has low hardness and abrasion resistance, and poor weathering resistance.

As known water-absorbing substances, there are natural polymers including starch type polymers such as hydrolyzates of starch-acrylonitrile graft polymers, and cellulosic polymers such as cellulose-acrylonitrile graft polymers; and synthetic polymers including polyvinyl alcohol type polymers such as crosslinked polyvinyl alcohol, acrylic polymers such as crosslinked sodium polyacrylate, and polyether type polymers such as crosslinked polyethylene glycol diacrylate.

When one of these substances is coated and formed into a film for use as an anti-fogging film for the purpose of preventing fogging, the lastingness of its effect is markedly improved compared with the case of the surfactant. When the water-absorbing substance is used for the anti-fogging film, however, the anti-fogging properties thereof tends to be impaired when an anti-reflection layer formed of a substance having a low refractive index or a protective layer is coated thereon.

When the water-absorbing substance is made into a thin film and its optical thickness [(geometrical thickness, d)× (refractive index, n)] is adjusted to an odd number times a quarter of the target wavelength whose reflection is to be prevented, thus using it as an anti-reflection film, the film tends not to attain sufficient anti-fogging properties because the thickness of the water-absorbing film is too thin.

SUMMARY OF THE INVENTION

Accordingly, it is an object of the present invention to provide an anti-fogging coating having an excellent anti-fogging effect.

Another object of the present invention is to provide an anti-fogging coating having excellent film strength and abrasion resistance.

A further object of the present invention is to provide an anti-fogging coating having an anti-reflection effect.

A still further object of the present invention is to provide an optical part provided with any of the above-described anti-fogging coatings.

The above objects can be achieved by the present invention described below.

According to the present invention, an anti-fogging coating formed on the surface of an optical substrate is provided, wherein the anti-fogging coating comprises a water-absorbing film and a porous film in the order near to the surface of the substrate.

According to the present invention, an optical part having an anti-fogging coating on the surface of an optical substrate is also provided, wherein the anti-fogging coating comprises a water-absorbing film and a porous film in the order near to the surface of the substrate.

In short, the anti-fogging effect of the anti-fogging coating according to the present invention is as follows. When water vapor near the surface of the anti-fogging coating is in a supersaturated state due to environmental conditions, water vapor adsorbed on the surface of the anti-fogging coating forms nuclei of droplets without undergoing reevaporation. Molecules of water in the atmosphere collide with the nuclei, and the nuclei grow. When droplets grow to a certain extent, they are absorbed in the interior of the porous film through fine pores (ducts). The water absorbed by the porous film reaches the water-absorbing film situated further inside and is fixed thereto. The anti-fogging effect of this coating lasts to the limit of water absorption power of the water-absorbing film. The limit of water absorption power means a state that the water absorption of the water-absorbing film reaches saturation. The water absorption power of the water-absorbing film is in proportion to the density of hydrophilic groups in the film and the thickness of the film.

The water absorption properties required of the porous film is reduced by the absorbing capacity of the water-absorbing film. As a result, latitude in selection of a material usable in the formation of the porous film is widened, so that a porous film having excellent strength and abrasion resistance can be formed with ease.

Further, even when the reflectance of an optical substrate, for example, a glass lens becomes higher in the case where the water-absorbing film is formed on the substrate and flare and ghost are caused in an optical instrument, the reflectance of the substrate can be lowered by presetting the optical thickness of the porous film so as to have an anti-reflection effect.

DESCRIPTION OF THE PREFERRED EMBODIMENTS

A film containing a water-absorbing polymer is suitable for the water-absorbing film. Examples of the water-absorbing polymer forming the water-absorbing layer include natural polymers including starch type polymers such as hydrolyzates of starch-acrylonitrile graft polymers, and cellulosic polymers such as cellulose-acrylonitrile graft polymers; and synthetic polymers including polyvinyl alcohol type polymers such as crosslinked polyvinyl alcohol, acrylic polymers such as crosslinked sodium polyacrylate, and polyether type polymers such as crosslinked polyethylene glycol diacrylate. Of these, the high water-absorbent substances such as polyacrylics and polyvinyl alcohol are preferably used.

Examples of the polyacrylics used in the present invention include polyacrylic acid, polymethacrylic acid, polyacrylamide and salts (potassium polyacrylate, sodium polyacrylate, etc.) thereof. Polyacrylic acid and polymethacrylic acid are preferably used.

The number average molecular weights of the polyacrylics are preferably within a range of from 3,000 to 1,500,000, particularly from 50,000 to 750,000.

As the water-absorbing polymers, those obtained by conducting a polycondensation reaction of a hydrolyzate of an inorganic alkoxide in the presence of at least a polyacrylic may also be preferably used.

Examples of the inorganic alkoxide compound used in the formation of an anti-fogging and anti-reflection film include compounds represented by the formulae $$M(OR)_a \quad (I)$$

$$M(OR)_n(X)_{a-n} \quad (II)$$

wherein M is an atom selected from the group consisting of Si, Al, Ti, Zr, Ca, Fe, V, Sn, Li, Be, B and P, R is an alkyl radical, X is an alkyl radical, an alkyl radical having a functional group, or halogen, a is a valence of M, and n is an integer of from 1 to a.

As X in the above formula (II), a carbonyl, carboxyl, amino or vinyl radical, or an alkyl radical having an epoxy group is preferred.

Particularly preferable examples of the inorganic alkoxides include $Si(OC_2H_5)_4$, $Al(O\text{-}iso\text{-}C_3H_7)_3$, $Ti(O\text{-}iso\text{-}C_3H_7)_4$, $Zr(O\text{---}t\text{---}C_4H_9)_4$, $Zr(o\text{---}n\text{---}C_4H_9)_4$, $Ca(OC_2H_5)_2$, $Fe(OC_2H_9)_3$, $V(O\text{-}iso\text{-}C_3H_7)_4$, $Sn(O\text{---}t\text{---}C_4H_9)_4$, $Li(OC_2H_5)$, $Be(OC_2H_5)_2$, $B(OC_2H_5)_3$, $P(OC_2H_5)_2$ and $P(OCH_3)_3$.

The water-absorbing film containing the water-absorbing polymer obtained from the inorganic alkoxide and the polyacrylic can be formed by applying a reaction solution containing at least one selected from an inorganic alkoxide, a hydrolyzate of the inorganic alkoxide and a low molecular weight polycondensate of the hydrolyzate, a polyacrylic and a catalyst for accelerating the polycondensation reaction of the hydrolyzate onto the surface of an optical substrate and heat-treating the coating film. The term "containing at least one selected from an inorganic alkoxide, a hydrolyzate of the inorganic alkoxide and a low molecular weight polycondensate of the hydrolyzate" means any one of the following four cases.

(1) An inorganic alkoxide is used for the preparation of the reaction solution, and the hydrolyzing reaction thereof is caused after the preparation of the reaction solution.

(2) A hydrolyzate of an inorganic alkoxide obtained by conducting the hydrolyzing reaction of the inorganic alkoxide is used for the preparation of the reaction solution.

(3) A low molecular weight polycondensate obtained by partially polycondensing a hydrolyzate of an inorganic alkoxide is used for the preparation of the reaction solution.

(4) At least two of an inorganic alkoxide, a hydrolyzate thereof and a low molecular weight polycondensate of the hydrolyzate are used for the preparation of the reaction solution.

When the inorganic alkoxide is contained in the reaction solution prepared, the hydrolyzing reaction of the inorganic alkoxide and the polycondensation reaction of the hydrolyzate thereof come to be caused in the presence of the polyacrylic. With the progress of the polycondensation reaction in the reaction solution, the viscosity of the solution increases. Therefore, the application of the reaction solution to the optical substrate is conducted before the viscosity becomes too high.

The thickness of the water-absorbing film is preferably within a range of from 0.5 to 20 μm. It is preferable that the water-absorbing film should absorb water in a proportion of at least 50% by weight of the weight of the water-absorbing film itself.

As the porous film preferred is an inorganic porous film formed by a vacuum process. Examples of the vacuum process include vacuum deposition process, EB process and sputtering process.

The packing rate of film-forming material in the porous film is preferably within a range of from 20 to 80%. When the packing rate of film-forming material is 20% or higher, the strength of the porous film can be enhanced. On the other hand, when the packing rate of film-forming material is 80% or lower, water easily penetrates into the porous film, so that the anti-fogging effect can be sufficiently achieved. The adjustment of the packing rate of film-forming material can be conducted by controlling the degree of vacuum and film-forming temperature in the vacuum process. When both degree of vacuum and film-forming temperature during the process in, for example, the vacuum EB process are controlled low, the packing rate of film-forming material tends to be lowered. The packing rate of film-forming material can be determined by the refractive index of the porous film. FIGS. 1 to 5 diagrammatically illustrate the respective relationships between the packing rate of film-forming material and refractive index (wavelength for measurement: 680 nm) of various porous films. The higher the packing rate of film-forming material is, the denser the texture of the porous film is. Thus, the refractive index becomes higher.

As components of the porous film composed of an inorganic substance, may be used inorganic substances such as $MgF_2$, $Ta_2O_5$, SiO, TiO, $CeO_2$, $SiO_2$, $TiO_2$ and $ZrO_2$.

The porous film may be constructed by two or more films. In this case, the multi-layer porous film is formed in such a manner that a porous film far from the water-absorbing film is more hydrophilic than a porous film near the water-absorbing film, thus enabling water to easily penetrate into the multi-layer porous film. A second water-absorbing film may also be provided on the porous film.

In order to allow the porous film to bring out an anti-reflection effect, the following conditions may be mentioned.

In the case where the porous film is composed of one film, it is preferable that its refractive index should be 1.4 or lower.

In the case where the porous film is composed of two films, it is preferable that the refractive index of a porous film near the water-absorbing film is higher than that of a porous film far from the water-absorbing film.

In the case where the porous film is composed of one film, it is preferable that its optical thickness ($n_1d_1$) should be within a range of $$0.8 \times k\lambda/4 \leq n_1d_1 \leq 1.2 \times k\lambda/4$$

wherein k is a positive odd number, $\lambda$ is a design wavelength selected from the range of from 400 to 900 nm, $n_1$ is a refractive index of the porous film, and $d_1$ is a thickness of the porous film.

In the case where the porous film is composed of two or more films, it is preferable that the optical thickness ($n_2d_2$) of a porous film farthest (i.e., outermost) from the water-absorbing film should be within a range of $$0.8 \times k\lambda/4 \leq n_2d_2 \leq 1.2 \times k\lambda/4$$

wherein k is a positive odd number, $\lambda$ is a design wavelength selected from the range of from 400 to 900 nm, $n_2$ is a refractive index of the outermost porous film, and $d_2$ is a thickness of the outermost porous film.

In the case where the porous film is composed of two or more films, and a porous film farthest (i.e., outermost) from the water-absorbing film has an optically negligible thickness (for example, 10 nm or smaller), it is preferable that the optical thickness ($n_3d_3$) of a porous film next to the outermost porous film should be within a range of $$0.8 \times k\lambda/4 \leq n_3d_3 \leq 1.2 \times k\lambda/4$$

wherein k is a positive odd number, $\lambda$ is a design wavelength selected from the range of from 400 to 900 nm, $n_3$ is a refractive index of the next porous film, and $d_3$ is a thickness of the next porous film.

In the case where the anti-fogging coating comprises a first water-absorbing film, a porous film and a second water-absorbing film in the order near to the surface of the substrate, it is preferable that the refractive index of the porous film is equal to or higher than that of the first water-absorbing film, and the thickness of the first water-absorbing film is within a range of from 1 to 20 $\mu$m, and besides, that the refractive index of the second water-absorbing film should be lower than that of the porous film, and the optical thickness ($n_4d_4$) thereof be within a range of $$0.8 \times k\lambda/4 \leq n_4d_4 \leq 1.2 \times k\lambda/4$$

wherein k is a positive odd number, $\lambda$ is a design wavelength selected from the range of from 400 to 900 nm, $n_4$ is a refractive index of the second water-absorbing film, and $d_4$ is a thickness of the second water-absorbing film.

Figure 1:
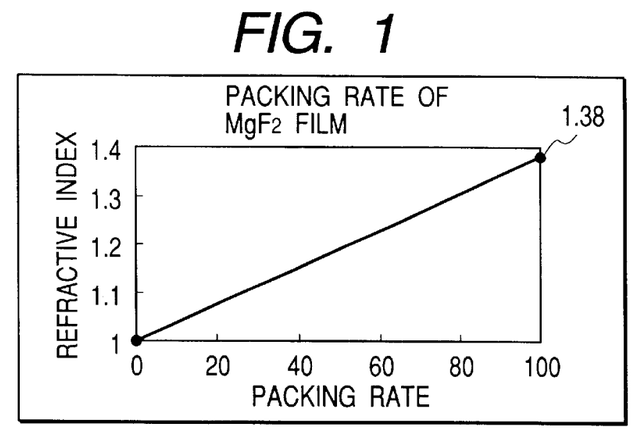
FIG. 1 illustrates the relationship between the packing rate of film-forming material and a refractive index of a $MgF_2$ film.
Figure 2:
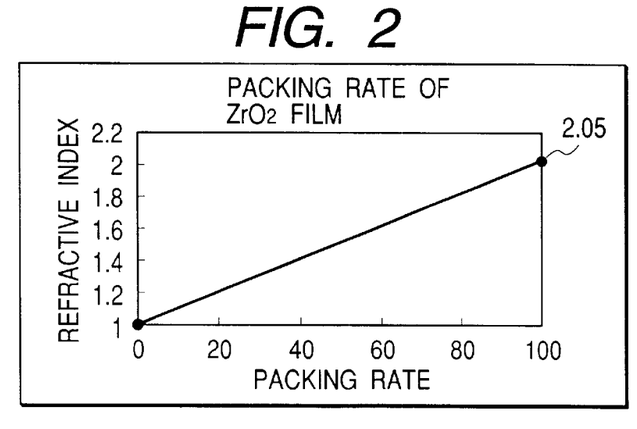
FIG. 2 illustrates the relationship between the packing rate of film-forming material and a refractive index of a $ZrO_2$ film.
Figure 3:
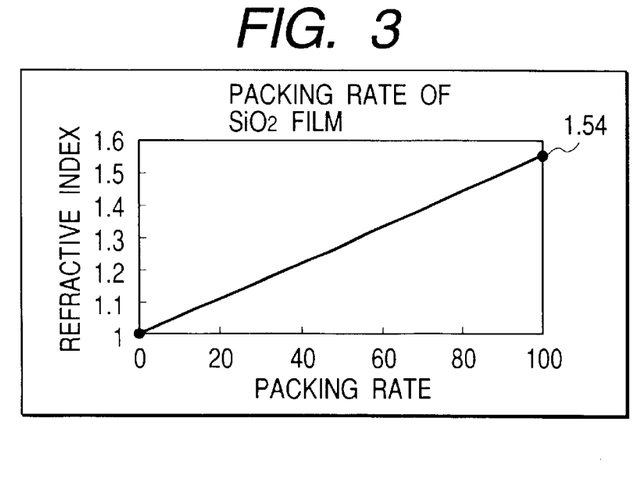
FIG. 3 illustrates the relationship between the packing rate of film-forming material and a refractive index of a $SiO_2$ film.
Figure 4:
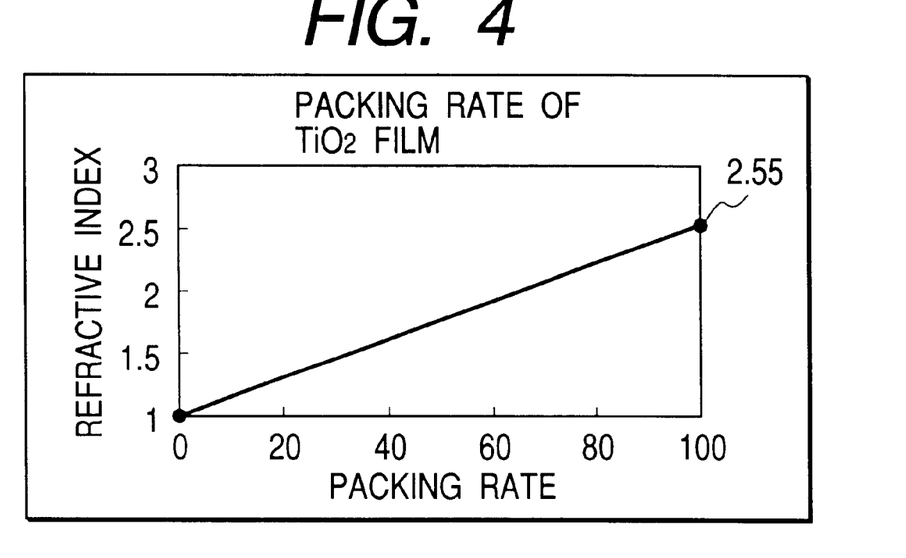
FIG. 4 illustrates the relationship between the packing rate of film-forming material and a refractive index of a $TiO_2$ film.
Figure 5:
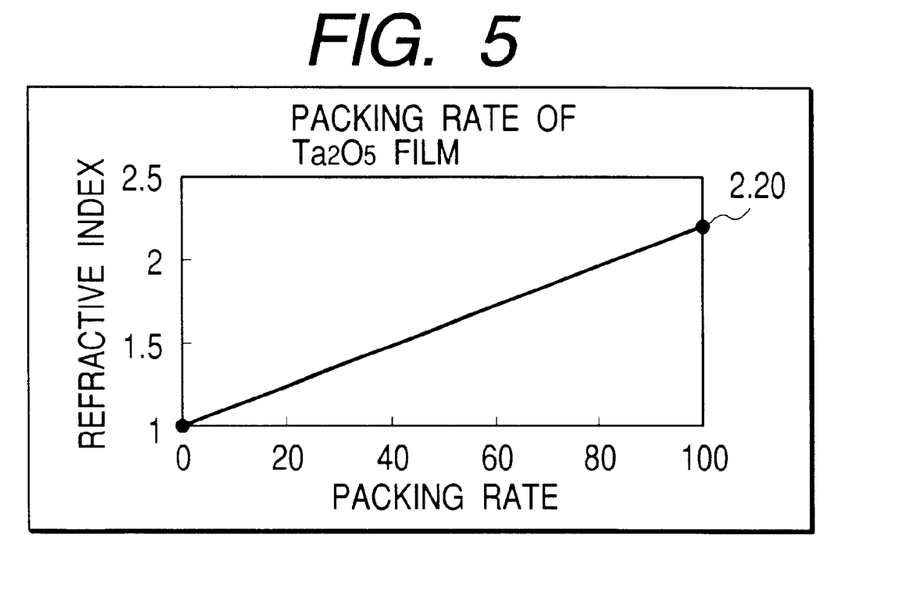
FIG. 5 illustrates the relationship between the packing rate of film-forming material and a refractive index of a $Ta_2O_5$ film.
Figure 6:
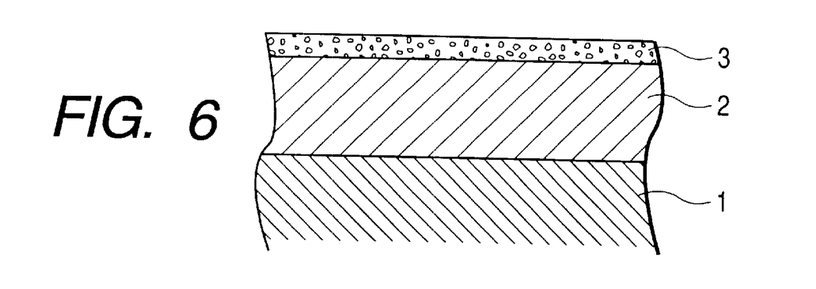
FIG. 6 is a cross-sectional view of an anti-fogging coating composed of two layers according to the present invention.

As illustrated in FIG. 6, the anti-fogging coating according to an embodiment of the present invention is composed of two layers of an inner layer which is a water-absorbing film 2 provided on the surface of an optical substrate 1, and an outer layer composed of a porous film 3 which is a porous, low-refractive index film provided on the water-absorbing film. The thickness of each film is preset according to a balance between requirements from optical surface precision and requirements from the degree of anti-fogging effect. In such a state that the optical substrate is coated with the water-absorbing film (inner layer) having a refractive index of about 1.50 in a thickness of 2.0 $\mu$m or greater, the reflectance of the surface amounts to about 4% or higher. This reflected light causes flare and ghost in an ordinary optical system such as lenses, and so incurs reduction of optical characteristics.

Therefore, the water-absorbing film is coated with a film (outer layer) having a refractive index lower than that of the water-absorbing film, whereby the surface reflection can be reduced. When the optical thickness of the outer layer is an odd number times as thick as a quarter of the target wavelength prevented from reflecting, a still more desirable anti-reflection effect can be exhibited. In such a manner, the water-absorbing film and the porous, low-refractive index film are provided as an inner layer and an outer layer, respectively, whereby both anti-fogging effect and anti-reflection effect can be brought about at the same time.

Figure 7:
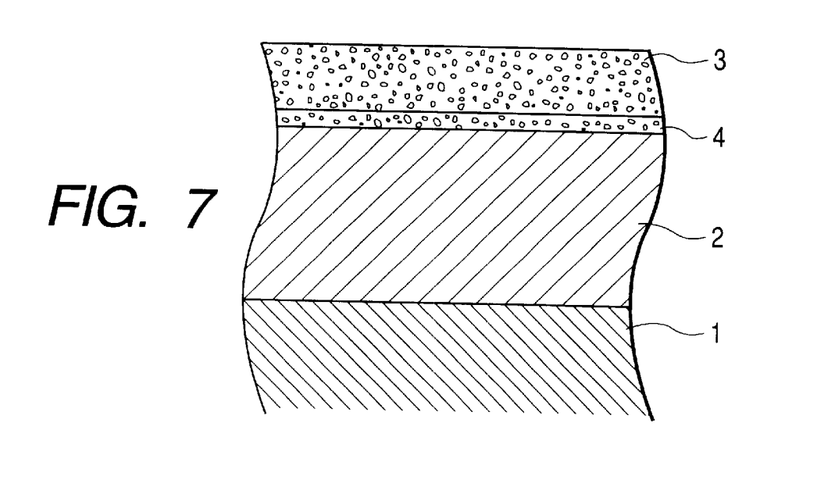
FIG. 7 is a cross-sectional view of an anti-fogging coating composed of three layers according to the present invention.

FIG. 7 is a cross-sectional view of an anti-fogging coating composed of three layers according to the present invention.

As illustrated in FIG. 7, this anti-fogging coating is composed of three layers of an inner layer which is a water-absorbing film 2 provided on the surface of an optical substrate 1, an intermediate layer composed of a porous film 4 which is a porous, high-refractive index film provided on the water-absorbing film, and an outer layer composed of a porous film 3 which is a porous, low-refractive index film provided on the porous film 4.

The porous, high-refractive index film is formed in a thickness of from one hundredth to one twenty-fifth of the target wavelength prevented from reflecting, in terms of optical thickness, which serves as the intermediate layer. The porous, low-refractive index film is then formed on the intermediate layer in a thickness of an odd number times a quarter of the target wavelength prevented from reflecting, in terms of optical thickness. As described above, the inner layer, intermediate layer and outer layer are formed on the surface of the optical substrate, thereby providing an anti-fogging coating excellent in anti-fogging properties and anti-reflection effect.

Figure 8:
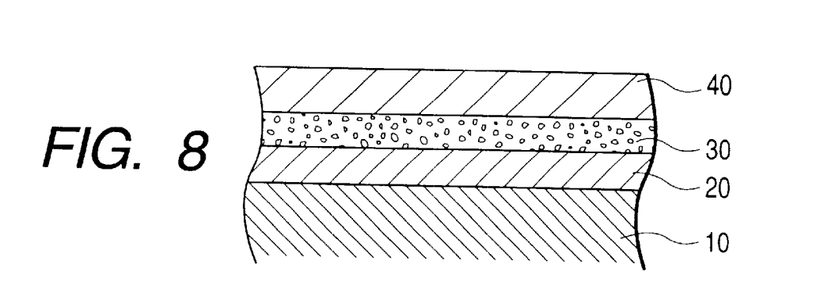
FIG. 8 is a cross-sectional view illustrating the layer construction of an optical part according to the present invention.

FIG. 8 is a cross-sectional view illustrating the layer constitution of an optical part according to the present invention.

This optical part is obtained by successively providing a water-absorbing film 20, a porous film 30 and a hydrophilic porous film 40 on an optical substrate 10.

No particular limitation is imposed on the optical substrate 10. Examples thereof include substrates respectively formed of transparent resins such as polystyrene, polycarbonate, polystyrene derivatives, polycarbonate derivatives and polymethyl methacrylate derivatives, and glass substrates.

No particular limitation is imposed on the process for forming the water-absorbing film. However, the substrate is commonly coated with a solution containing a high water-absorbent substance using a coating method such as dip coating, spray coating or spin coating to form the film.

No particular limitation is imposed on a hydrophilic inorganic substance used for the hydrophilic porous film 40 so far as it has hydrophilicity to such an extent that the object of gaining the anti-fogging effect can be achieved because water adhered to the surface of the porous film is made to easily penetrate into the porous film by its hydrophilic effect and is absorbed into the water-absorbing film. However, a contact angle with water (25° C.) is preferably no more than 80°, and $SiO_2$ or a metal oxide such as $TiO_2$ or $ZrO_2$ is preferably used for such a water-absorbing film. The contact angle of $MgF_2$ with water is more than 100°.

Figure 9:
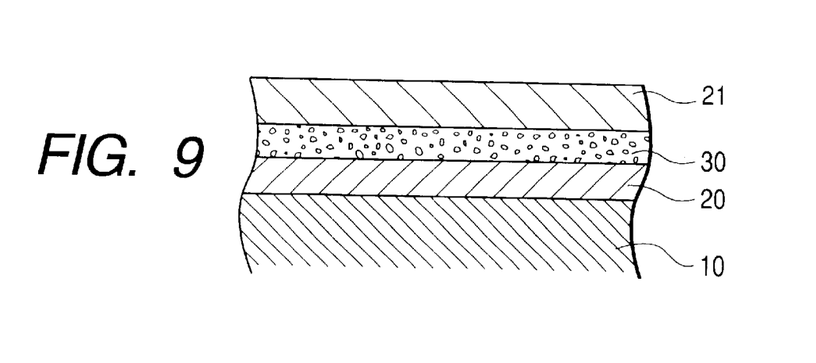
FIG. 9 is a cross-sectional view illustrating the layer construction of another optical part according to the present invention.

FIG. 9 is a cross-sectional view illustrating the layer construction of another optical part according to the present invention.

This optical part is obtained by successively providing a first water-absorbing film 20, a porous film 30 and a second water-absorbing film 21 on an optical substrate 10.

The porous film is a transparent porous film which is formed by a vacuum deposition process. It is desirable that the relationship between the refractive index ($n_5$) of the porous film and the refractive index ($n_6$) of the first water-absorbing film should satisfy $n_6 \leq n_5$, while the relationship between the refractive index ($n_5$) of the porous film and the refractive index ($n_4$) of the second water-absorbing film satisfies $n_4 < n_5$. By satisfying these relationships, it is possible to use the second water-absorbing film as an anti-reflection film as described below.

It is also preferable that the optical thickness ($n_4 d_4$) of the second water-absorbing film is within a range of $$0.8 \times k\lambda/4 \leq n_4 d_4 \leq 1.2 \times k\lambda/4$$

wherein k is a positive odd number, λ is a design wavelength selected from the range of from 400 to 900 nm, $n_4$ is a refractive index of the second water-absorbing film, and $d_4$ is a thickness of the second water-absorbing film. The second water-absorbing film can be used as an anti-reflection film by adjusting the difference between the refractive indices of the porous film and the second water-absorbing film and the optical thickness of the second water-absorbing film in the aforementioned manner.

The present invention will hereinafter be described more specifically by the following examples. However, the present invention is not limited to these examples.

EXAMPLE 1-1

To 986.4 g of Liquid A (a liquid obtained by adding 80 parts by weight of methanol to 2 parts of a 25% aqueous solution of polyacrylic acid having a number average molecular weight of 300,000), 13.6 g of Liquid B [a liquid obtained by adding 3 g of a tetramer of tetraethoxysilane (Ethylsilicate 40, trade name, product of Colcoat Co., Ltd.), 4.6 g of a silane coupling agent (SH6040, trade name, product of Dow Corning Toray Silicone Co., Ltd.), 0.1 g of 2N hydrochloric acid and 0.1 g of N,N-dimethylbenzylamine to a solution of 0.5 g of aluminum isopropoxide, 0.4 g of 35% hydrochloric acid and 0.9 g of water in 4 g of ethanol] was added. The resulting mixture was stirred for 2 minutes at ordinary temperature to prepare Coating Formulation C. A borosilicate glass sheet having a thickness of 1.2 mm was dipped in the thus-prepared Coating Formulation C and lifted at a rate of 120 mm/min, thereby coating the sheet. The coated sheet was air-dried for 30 minutes and then heated and dried at 150° C. for 10 minutes. The thus-formed water-absorbing film was transparent, and its refractive index and thickness were 1.48 and about 10 μm, respectively. The coated glass sheet was placed in a vacuum deposition apparatus to deposit magnesium fluoride on both sides of the glass sheet while maintaining the temperature of the glass sheet so as not to exceed 30° C. and keeping the pressure of a vacuum chamber at $10^{-4}$ mmHg or lower. At this time, the optical thickness of the magnesium fluoride film deposited was controlled to about 125 nm using an interference type optical film thickness monitor. The deposited film of magnesium fluoride was a porous film having a refractive index (wavelength for measurement: 680 nm; the same shall apply hereinafter) of 1.30 and a packing rate of about 80%.

The transmittance of the thus-prepared glass sheet provided with the two films was measured in a visible wavelength region by means of a self-recording spectrophotometer (U-4000, trade name, manufactured by Hitachi Ltd.). As a result, it was found that the transmittance was increased by a maximum of 5% compared with the glass sheet before the two films were applied. This glass sheet was kept for 30 minutes in a refrigerator controlled at 5° C. and then placed in a thermo-hygrostatic chamber controlled at 25° C. and 80% RH. As a result, no occurrence of fogging was observed.

COMPARATIVE EXAMPLE 1-1

The same untreated borosilicate glass sheet as that used in Example 1-1 was kept for 30 minutes in a refrigerator controlled at 5° C. and then placed in a thermo-hygrostatic chamber controlled at 25° C. and 80% RH. As a result, fogging due to dew condensation occurred within a second.

EXAMPLE 1-2

The anti-fogging coating-coated glass sheet prepared in Example 1-1 was worked and installed as protective glass at the rear of eyepieces of a binocular (12X361S, trade name, manufactured by Canon Inc.). The binocular, on which the protective glass had been installed, was left to stand for about 2 hours in the open air of 0° C. and about 70% HR and then used. As a result, neither the protective glass nor the eyepieces underwent fogging. In addition, no deterioration of image by ghost and flare was caused by the installation of the protective glass.

COMPARATIVE EXAMPLE 1-2

The same binocular as that used in Example 1-2 except that no protective glass was installed at the rear of eyepieces was left to stand for about 2 hours in the open air of 0° C. and about 70% HR and then used. As a result, fogging occurred on the eyepieces, and so the binocular could not be used unless the fog was removed.

EXAMPLE 1-3

After the water-absorbing film was formed in the same manner as in Example 1-1, the coated glass sheet was placed in a vacuum deposition apparatus to successively deposit porous films of zirconium oxide and magnesium fluoride on both sides of the glass sheet while keeping the pressure of a vacuum chamber at $10^{-4}$ mmHg or lower. At this time, the optical thicknesses of the zirconium oxide and magnesium fluoride films were controlled to 10 nm and 125 nm, respectively. The control of the film thickness was conducted by using an interference type optical film thickness monitor.

The temperature of the substrate during the deposition of zirconium oxide and magnesium fluoride was maintained so as not to exceed 30° C., whereby the zirconium oxide film was provided as a porous film having a refractive index of 1.68 and a packing rate of about 65%, while the magnesium fluoride film was provided as a porous film having a refractive index of 1.30 and a packing rate of about 80%.

The transmittance of the thus-prepared glass sheet provided with the anti-fogging coating was measured in a visible wavelength region by means of a self-recording spectrophotometer (U-4000, trade name, manufactured by Hitachi Ltd.). As a result, it was found that the transmittance was increased by a maximum of 8% compared with the glass sheet before the anti-fogging coating was applied.

This glass sheet was kept for 30 minutes in a refrigerator controlled at 5° C. and then placed in a thermo-hygrostatic chamber controlled at 25° C. and 80% RH. As a result, no occurrence of fogging was observed.

COMPARATIVE EXAMPLE 1-3

The same untreated borosilicate glass sheet as that used in Example 1-3 was kept for 30 minutes in a refrigerator controlled at 5° C. and then placed in a thermo-hygrostatic chamber controlled at 25° C. and 80% RH. As a result, fogging due to dew condensation occurred within a second.

EXAMPLE 1-4

The anti-fogging coating-coated glass sheet prepared in Example 1-3 was worked and installed as protective glass at the rear of eyepieces of a binocular (12X361S, trade name, manufactured by Canon Inc.). The binocular, on which the protective glass had been installed, was left to stand for about 2 hours in the open air of 0° C. and about 70% HR and then used. As a result, neither the protective glass nor the eyepieces underwent fogging. In addition, neither ghost nor flare was caused by the installation of the protective glass, and so good telescopic images could be observed.

COMPARATIVE EXAMPLE 1-4

After the protective glass coated with the anti-fogging coating was removed from the binocular used in Example 1-4, the binocular was left to stand for about 2 hours in the open air of 0° C. and about 70% HR and then used. As a result, fogging occurred on the eyepieces, and so the binocular could not be used unless the fog was removed.

EXAMPLE 2-1

A glass (BK7) filter having a thickness of 2 mm was coated with a water-methanol solution containing 1 parts by weight of polyacrylic acid (a 20 mol % saponification product of the methyl ester; weight average molecular weight: 150,000) and 4 parts by weight of polyvinyl alcohol (polymerization degree: 2,000; saponification degree: 82 mol %) by dip coating. The coated filter was dried at 150° C. for 15 minutes to harden the coating, thereby forming a water-absorbing film having a thickness of 5 μm on both sides of the filter. The thus-obtained water-absorbing film had a refractive index of 1.48.

A $MgF_2$ film was formed on each of the water-absorbing films by an EB process until its reflectance reached a minimum as measured by means of an optical monitor using light having a wavelength of 530 nm. At this time, the degree of vacuum was controlled to $1 \times 10^{-4}$ Torr with argon.

The $MgF_2$ film deposited had a thickness of 90 nm in terms of bulk in a quartz crystal oscillator film thickness meter. The temperature of the substrate was controlled to 150° C. The $MgF_2$ film had a refractive index of 1.24 and a packing rate of 65%.

The layer constitution of the anti-fogging coating is shown in Table 1.

The anti-fogging property thereof was evaluated from the following points of view.

1. One's breath was blown against a sample in an atmosphere of room temperature (30° C., 80% HR) to observe whether fogging occurred or not.

2. A sample was removed from an environment of 5° C. into an environment of room temperature (30° C., 80% HR) to observe whether fogging occurred or not.

The above sample was not fogged by blowing one's breath against it in the atmosphere of room temperature (30° C., 80% HR), and underwent no particular change thereafter.

The sample was not fogged by removing it from the environment of 5° C. into the environment of room temperature (30° C., 80% HR), and underwent no particular change thereafter.

The durability thereof was evaluated from the following points of view.

1. A sample was wiped 30 times with wiping paper (Dusper, trade name; product of OZU Co., Ltd., Tokyo) soaked with a wiping solvent (EE-6310, trade name; product of OLYMPUS OPTICAL CO., LTD.) for lens under a load of 300 g to observe whether the surface of the sample underwent a change or not.

2. A sample was wiped 30 times with wiping paper (Dusper, trade name; product of OZU Co., Ltd., Tokyo) soaked with water under a load of 300 g to observe whether the surface of the sample underwent a change or not.

The above sample was damaged by the solvent and underwent separation (or peeling) by water.

COMPARATIVE EXAMPLE 2-1

A water-absorbing film having a thickness of 5 μm was formed on both sides of a glass (BK7) filter having a thickness of 2 mm in the same manner as in Example 2-1.

A $MgF_2$ film was formed on each of the water-absorbing films by an EB process until its reflectance reached a minimum as measured by means of an optical monitor using light having a wavelength of 530 nm. At this time, the degree of vacuum was controlled to $4 \times 10^{-5}$ Torr with argon.

The $MgF_2$ film deposited had a thickness of 90 nm in terms of bulk in a quartz crystal oscillator film thickness meter. The temperature of the substrate was controlled to 150° C. The $MgF_2$ film had a refractive index of 1.30 and a packing rate of 80%.

The layer constitution of the anti-fogging coating is shown in Table 1.

The anti-fogging properties and durability thereof were evaluated in the same manner as in Example 2-1.

With respect to the anti-fogging properties, the above sample was first fogged by blowing one's breath against it in the atmosphere of room temperature (30° C., 80% HR), and then showed a wetted state. When the sample was dried, a foggy mark was left. The sample was first fogged also by removing it from the environment of 5° C. into the environment of room temperature (30° C., 80% HR), and then showed a wetted state. When the sample was dried, a foggy mark was left.

With respect to the durability, the above sample underwent no change with the solvent, but underwent separation by water.

EXAMPLE 2-2

A water-absorbing film having a thickness of 5 μm was formed on both sides of a glass (BK7) filter having a thickness of 2 mm in the same manner as in Example 2-1.

In contrast with Comparative Example 2-1, a $ZrO_2$ film was formed on each of the water-absorbing films by an EB process. The formation of the $ZrO_2$ film was conducted under conditions of $5 \times 10^{-4}$ Torr in an atmosphere of argon, and the thickness of the $ZrO_2$ film was adjusted to 10 nm in terms of bulk. The $ZrO_2$ film had a refractive index of 1.68 and a packing rate of 65%.

A $MgF_2$ film was further formed on each of the $ZrO_2$ films by an EB process until its reflectance reached a minimum as measured by means of an optical monitor using light having a wavelength of 530 nm. At this time, the degree of vacuum was controlled to $4 \times 10^{-5}$ Torr with argon.

The $MgF_2$ film deposited had a thickness of 90 nm in terms of bulk in a quartz crystal oscillator film thickness meter. The $MgF_2$ film had a refractive index of 1.30 and a packing rate of 80%.

The layer constitution of the anti-fogging coating is shown in Table 1.

The anti-fogging properties and durability thereof were evaluated in the same manner as in Example 2-1.

With respect to the anti-fogging properties, the above sample was not fogged by blowing one's breath against it in the atmosphere of room temperature (30° C., 80% HR), and underwent no particular change thereafter. The sample was not fogged by removing it from the environment of 5° C. into the environment of room temperature (30° C., 80% HR), and underwent no particular change thereafter.

With respect to the durability, the above sample underwent no change with the solvent, but underwent partial separation by water.

Compared with Comparative Example 2-1, no foggy mark was left on the porous film, and its water resistance was also improved.

EXAMPLE 2-3

A water-absorbing film having a thickness of 0.8 μm was formed on both sides of a glass (BK7) filter having a thickness of 2 mm in the same manner as in Example 2-1.

A $ZrO_2$ film was formed on each of the water-absorbing films by an EB process. The formation of the $ZrO_2$ film was conducted under conditions of $4 \times 10^{-4}$ Torr in an atmosphere of argon, and the thickness of the $ZrO_2$ film was adjusted to 10 nm in terms of bulk. The $ZrO_2$ film had a refractive index of 1.74 and a packing rate of 70%.

A $MgF_2$ film was further formed on each of the $ZrO_2$ films by an EB process until its reflectance reached a minimum as measured by means of an optical monitor using light having a wavelength of 530 nm. At this time, the degree of vacuum was controlled to $4 \times 10^{-5}$ Torr with argon.

The $MgF_2$ film deposited had a thickness of 90 nm in terms of bulk in a quartz crystal oscillator film thickness meter. The $MgF_2$ film had a refractive index of 1.30 and a packing rate of 80%.

The layer constitution of the anti-fogging coating is shown in Table 1.

The anti-fogging properties and durability thereof were evaluated in the same manner as in Example 2-1.

With respect to the anti-fogging property, the above sample was not fogged by blowing one's breath against it in the atmosphere of room temperature (30° C., 80% HR), and underwent no particular change thereafter. The sample was not fogged by removing it from the environment of 5° C. into the environment of room temperature (30° C., 80% HR), and underwent no particular change thereafter.

With respect to the durability, the above sample underwent no change with both solvent and water.

EXAMPLE 2-4

A water-absorbing film having a thickness of 0.8 μm was formed on both sides of a glass (BK7) filter having a thickness of 2 mm in the same manner as in Example 2-1. A $TiO_2$ film was formed in place of the $ZrO_2$ film in Example 2-2 on each of the water-absorbing films by an EB process. The formation of the $TiO_2$ film was conducted under conditions of $4 \times 10^{-4}$ Torr in an atmosphere of argon, and the thickness of the $TiO_2$ film was adjusted to 10 nm in terms of bulk. The $TiO_2$ film had a refractive index of 2.09 and a packing rate of 70%.

A $MgF_2$ film was further formed on each of the $TiO_2$ films by an EB process until its reflectance reached a minimum as measured by means of an optical monitor using light having a wavelength of 530 nm. At this time, the degree of vacuum was controlled to $4 \times 10^{-5}$ Torr with argon.

The $MgF_2$ film deposited had a thickness of 90 nm in terms of bulk in a quartz crystal oscillator film thickness meter. The $MgF_2$ film had a refractive index of 1.30 and a packing rate of 80%.

The layer constitution of the anti-fogging coating is shown in Table 1.

The anti-fogging properties and durability thereof were evaluated in the same manner as in Example 2-1.

With respect to the anti-fogging properties, the above sample was not fogged by blowing one's breath against it in the atmosphere of room temperature (30° C., 80% HR), and underwent no particular change thereafter. The sample was not fogged by removing it from the environment of 5° C. into the environment of room temperature (30° C., 80% HR), and underwent no particular change thereafter.

With respect to the durability, the above sample underwent no change with both solvent and water.

EXAMPLE 2-5

A water-absorbing film having a thickness of 0.8 μm was formed on both sides of a glass (BK7) filter having a thickness of 2 mm in the same manner as in Example 2-1. A $Ta_2O_5$ film was formed in place of the $ZrO_2$ film in Example 2-3 on each of the water-absorbing films by an EB process. The formation of the $Ta_2O_5$ film was conducted under conditions of $4\times10^{-4}$ Torr in an atmosphere of argon, and the thickness of the $Ta_2O_5$ film was adjusted to 10 nm in terms of bulk. The $Ta_2O_5$ film had a refractive index of 1.84 and a packing rate of 70%.

A $MgF_2$ film was further formed on each of the $Ta_2O_5$ films by an EB process until its reflectance reached a minimum as measured by means of an optical monitor using light having a wavelength of 530 nm. At this time, the degree of vacuum was controlled to $4\times10^{-5}$ Torr with argon.

The $MgF_2$ film deposited had a thickness of 90 nm in terms of bulk in a quartz crystal oscillator film thickness meter. The $MgF_2$ film had a refractive index of 1.30 and a packing rate of 80%.

The layer constitution of the anti-fogging coating is shown in Table 1.

The anti-fogging properties and durability thereof were evaluated in the same manner as in Example 2-1.

With respect to the anti-fogging properties, the above sample was not fogged by blowing one's breath against it in the atmosphere of room temperature (30° C., 80% HR), and underwent no particular change thereafter. The sample was not fogged by removing it from the environment of 5° C. into the environment of room temperature (30° C., 80% HR), and underwent no particular change thereafter.

With respect to the durability, the above sample underwent no change with both solvent and water.

A $SiO_2$ film was formed on each of the water-absorbing films by an ES process until its reflectance reached a minimum as measured by means of an optical monitor using light having a wavelength of 530 nm. At this time, the degree of vacuum was controlled to $5\times10^{-4}$ Torr with argon.

The $SiO_2$ film deposited had a thickness of 35 nm in terms of bulk in a quartz crystal oscillator film thickness meter. The temperature of the substrate was controlled to 150° C. The $SiO_2$ film had a refractive index of 1.43 and a packing rate of 80%.

Figure 11:
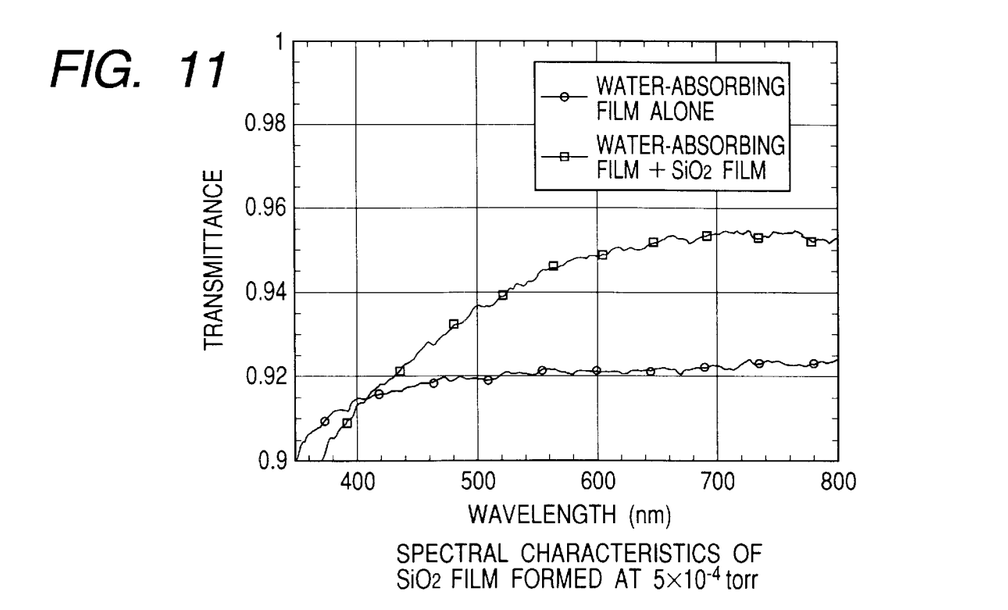
FIG. 11 diagrammatically illustrates spectral characteristics of an anti-fogging coating according to another embodiment of the present invention.

Its spectral characteristics in a visible region are illustrated in FIG. 11.

The packing rate of $SiO_2$ was lowered by reducing the degree of vacuum to $5\times10^{-4}$ Torr, whereby the refractive index of the $SiO_2$ film was lowered, and so the transmission characteristics of the substrate were improved.

Since the packing rate was lowered, the water permeability of the $SiO_2$ film was improved, so that the anti-fogging properties thereof was such that it was not fogged both by blowing one's breath against it in the atmosphere of room temperature (30° C., 80% HR) and by removing it from the environment of 5° C. into the environment of room temperature (30° C., 80% HR).

COMPARATIVE EXAMPLE 3-1

A water-absorbing film having a thickness of 5 μm was formed on both sides of a glass (BK7) filter having a thickness of 2 mm in the same manner as in Example 2-1.

TABLE 1

(Constitution of inorganic porous film and water-absorbing film)

| | Layer constitution | Thickness of water-absorbing film | Degree of vacuum upon formation of $MgF_2$ film | Anti-reflection properties | Anti-fogging properties | Durability Solvent | Durability Water |
|---|---|---|---|---|---|---|---|
| Ex. 2-1 | $MgF_2$ Water-absorbing film Substrate | 5 μm | $1\times10^{-4}$ Torr | A | A | B; damaged | C |
| Comp. Ex. 2-1 | $MgF_2$ Water-absorbing film Substrate | 5 μm | $4\times10^{-5}$ Torr | A | B; fogged and then became opaque | A | C |
| Ex. 2-2 | $MgF_2$ $ZrO_2$ Water-absorbing film Substrate | 5 μm | $4\times10^{-5}$ Torr | A | A | A | B; damaged |
| Ex. 2-3 | $MgF_2$ $ZrO_2$ Water-absorbing film Substrate | 0.8 μm | $4\times10^{-5}$ Torr | A | A | A | A |
| Ex. 2-4 | $MgF_2$ $TiO_2$ Water-absorbing film Substrate | 0.8 μm | $4\times10^{-5}$ Torr | A | A | A | A |
| Ex. 2-5 | $MgF_2$ $Ta_2O_5$ Water-absorbing film Substrate | 0.8 μm | $4\times10^{-5}$ Torr | A | A | A | A |

A: Good
C: Poor

EXAMPLE 3-1

A water-absorbing film having a thickness of 5 μm was formed on both sides of a glass (BK7) filter having a thickness of 2 mm in the same manner as in Example 2-1.

A $SiO_2$ film was formed on each of the water-absorbing films by an EB process until its reflectance reached a minimum as measured by means of an optical monitor using light having a wavelength of 530 nm. At this time, the degree of vacuum was controlled to $1\times10^{-4}$ Torr with argon.

The SiO$_2$ film deposited had a thickness of 80 nm in terms of bulk in a quartz crystal oscillator film thickness meter. The temperature of the substrate was controlled to 150° C. The SiO$_2$ film had a refractive index of 1.49 and a packing rate of 90%.

Figure 10:
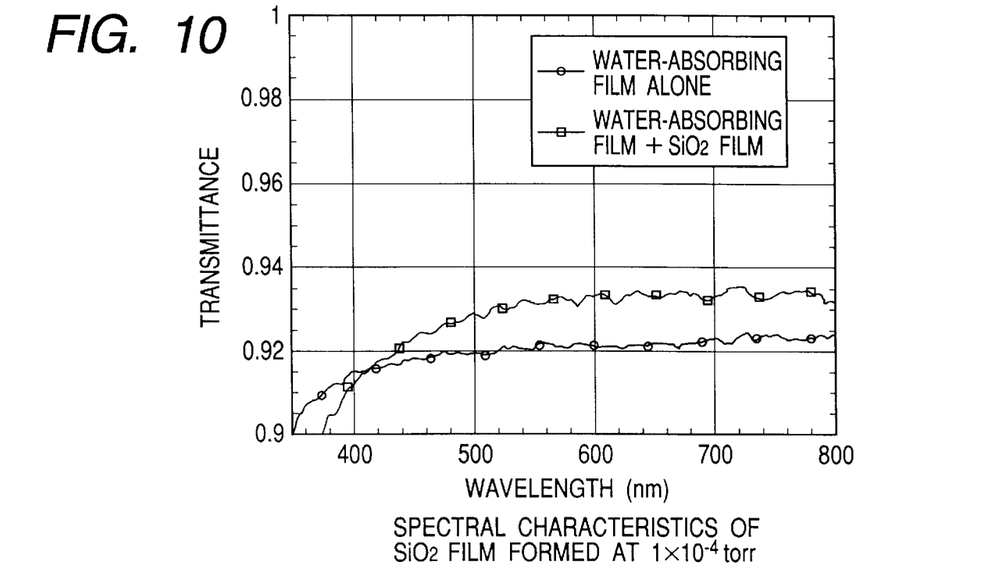
FIG. 10 diagrammatically illustrates spectral characteristics of an anti-fogging coating according to an embodiment of the present invention.

Its spectral characteristics in a visible region are illustrated in FIG. 10.

The anti-fogging properties of this sample was such that it was fogged both by blowing one's breath against it in the atmosphere of room temperature (30° C., 80% HR) and by removing it from the environment of 5° C. into the environment of room temperature (30° C., 80% HR).

COMPARATIVE EXAMPLE 3-2

A water-absorbing film having a thickness of 5 μm was formed on both sides of a glass (BK7) filter having a thickness of 2 mm in the same manner as in Example 2-1.

A ZrO$_2$ film was formed on each of the water-absorbing films by an EB process. The formation of the ZrO$_2$ film was conducted under conditions of $1 \times 10^{-4}$ Torr in an atmosphere of argon, and the thickness of the ZrO$_2$ film was adjusted to 10 nm in terms of bulk. The ZrO$_2$ film had a refractive index of 1.95 and a packing rate of 90%.

A SiO$_2$ film was further formed on each of the ZrO$_2$ films by an EB process until its reflectance reached a minimum as measured by means of an optical monitor using light having a wavelength of 530 nm. At this time, the degree of vacuum was controlled to $5 \times 10^{-4}$ Torr with argon.

The SiO$_2$ film deposited had a thickness of 35 nm in terms of bulk in a quartz crystal oscillator film thickness meter. The SiO$_2$ film had a refractive index of 1.43 and a packing rate of 80%.

The anti-fogging properties of this sample was such that it was fogged both by blowing one's breath against it in the atmosphere of room temperature (30° C., 80% HR) and by removing it from the environment of 5° C. into the environment of room temperature (30° C., 80% HR).

EXAMPLE 3-2

A water-absorbing film having a thickness of 5 μm was formed on both sides of a glass (BK7) filter having a thickness of 2 mm in the same manner as in Example 2-1.

A ZrO$_2$ film was formed on each of the water-absorbing films by an EB process. The formation of the ZrO$_2$ film was conducted under conditions of $2 \times 10^{-4}$ Torr in an atmosphere of argon, and the thickness of the ZrO$_2$ film was adjusted to 10 nm in terms of bulk. The ZrO$_2$ film had a refractive index of 1.84 and a packing rate of 80%.

A SiO$_2$ film was further formed on each of the ZrO$_2$ films by an EB process until its reflectance reached a minimum as measured by means of an optical monitor using light having a wavelength of 530 nm. At this time, the degree of vacuum was controlled to $5 \times 10^{-4}$ Torr with argon.

The SiO$_2$ film deposited had a thickness of 35 nm in terms of bulk in a quartz crystal oscillator film thickness meter. The SiO$_2$ film had a refractive index of 1.43 and a packing rate of 80%.

Figure 13:
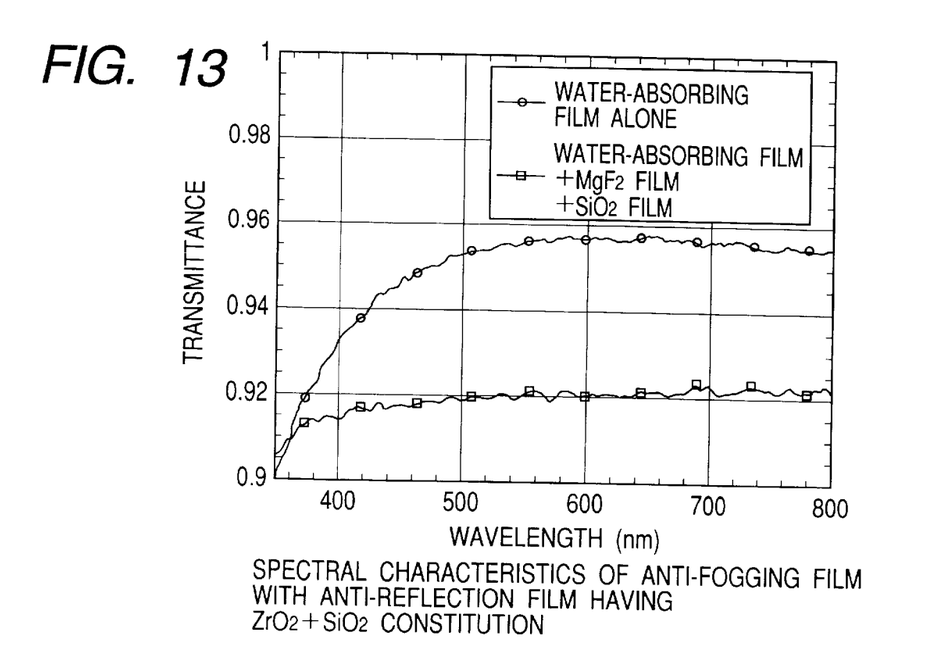
FIG. 13 diagrammatically illustrates spectral characteristics of an anti-fogging coating according to a still further embodiment of the present invention.

Its spectral characteristics in a visible region are illustrated in FIG. 13.

The anti-reflection performance of this sample was more improved than that in Example 3-1 by taking a multi-layer construction, and so the transmission characteristics thereof were improved.

The packing rate of ZrO$_2$ was lowered to 80% by reducing the degree of vacuum upon the formation of the ZrO$_2$ film to $2 \times 10^{-4}$ Torr, whereby the water permeability of the film was improved, so that the anti-fogging properties thereof was such that it was not fogged both by blowing one's breath against it in the atmosphere of room temperature (30° C., 80% HR) and by removing it from the environment of 5° C. into the environment of room temperature (30° C., 80% HR).

COMPARATIVE EXAMPLE 3-3

A water-absorbing film having a thickness of 5 μm was formed on both sides of a glass (BK7) filter having a thickness of 2 mm in the same manner as in Example 2-1.

A MgF$_2$ film was formed on each of the water-absorbing films by an EB process until its reflectance reached a minimum as measured by means of an optical monitor using light having a wavelength of 530 nm. At this time, the degree of vacuum was controlled to $5 \times 10^{-5}$ Torr with argon.

The MgF$_2$ film deposited had a thickness of 35 nm in terms of bulk in a quartz crystal oscillator film thickness meter. The MgF$_2$ film had a refractive index of 1.51 and a packing rate of 95%.

The anti-fogging property of this sample was such that it was fogged both by blowing one's breath against it in the atmosphere of room temperature (30° C., 80% HR) and by removing it from the environment of 5° C. into the environment of room temperature (30° C., 80% HR).

EXAMPLE 3-3

A water-absorbing film having a thickness of 5 μm was formed on both sides of a glass (BK7) filter having a thickness of 2 mm in the same manner as in Example 2-1.

A MgF$_2$ film was formed on each of the water-absorbing films by an EB process until its thickness reached 82 nm in terms of bulk in a quartz crystal oscillator film thickness meter. At this time, the degree of vacuum was controlled to $5 \times 10^{-5}$ Torr with argon.

Thereafter, a SiO$_2$ film was formed on each of the MgF$_2$ films by an EB process until its reflectance reached a minimum as measured by means of an optical monitor using light having a wavelength of 530 nm. The formation of the SiO$_2$ film was conducted under conditions of $5 \times 10^{-4}$ Torr in an atmosphere of argon. The SiO$_2$ film deposited had a thickness of 5 nm in terms of bulk. The SiO$_2$ film had a refractive index of 1.43 and a packing rate of 80%.

Figure 12:
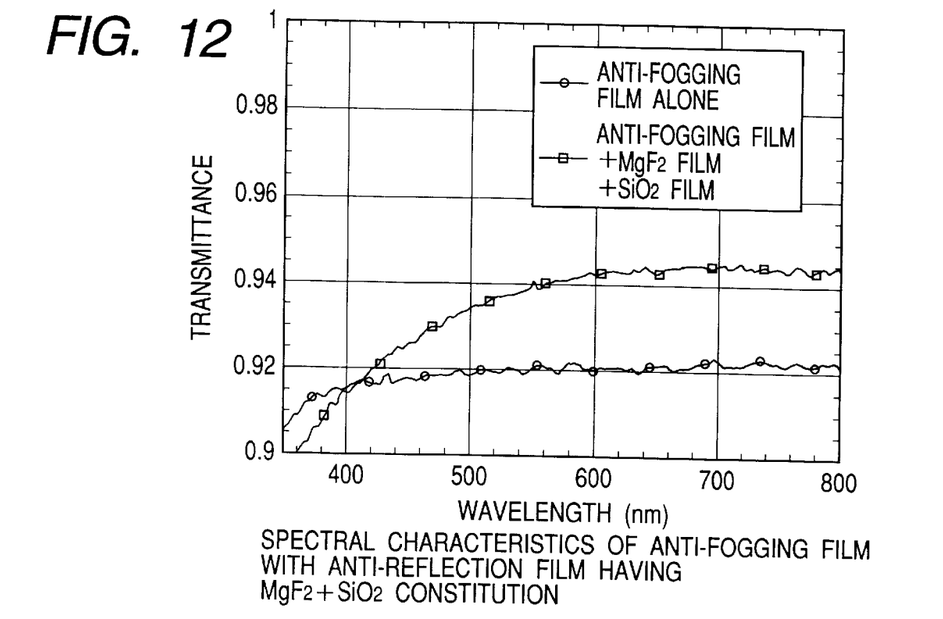
FIG. 12 diagrammatically illustrates spectral characteristics of an anti-fogging coating according to a further embodiment of the present invention.

Its spectral characteristics in a visible region are illustrated in FIG. 12.

The film of the hydrophilic inorganic substance was provided as a surface layer, whereby the wettability of the anti-fogging coating was improved. As a result, water adhered thereto penetrated up to the water-absorbing film without remaining at the surface. The anti-fogging properties of this sample was such that it was not fogged both by blowing one's breath against it in the atmosphere of room temperature (30° C., 80% HR) and by removing it from the environment of 5° C. into the environment of room temperature (30° C., 80% HR).

EXAMPLE 3-4

Experiment 1

A water-absorbing film was formed on both sides of a glass (BK7) substrate in the same manner as in Example 2-1. At this time, the thickness of the water-absorbing film was 10 μm. A porous film composed of ZrO$_2$ was formed in a thickness of 30 nm on each of the water-absorbing films by a vacuum deposition process. The ZrO$_2$ film had a refractive index of 1.68 and a packing rate of 65%. A second water-absorbing film was then formed on each of the porous films in the same manner as described above. At this time, the optical thickness of the second water-absorbing film was adjusted to 135 nm.

Experiment 2

A water-absorbing film was formed on both sides of a glass (BK7) substrate in the same manner as in Example 2-1. At this time, the thickness of the water-absorbing film was 10 μm. A porous film composed of $ZrO_2$ was formed in a thickness of 30 nm on each of the water-absorbing films by a vacuum deposition process. A porous film composed of $MgF_2$ was formed while adjusting it in such a manner that the optical thickness thereof was 135 nm. The $ZrO_2$ film had a refractive index of 1.68 and a packing rate of 65%, while the $MgF_2$ film had a refractive index of 1.30 and a packing rate of 80%.

Experiment 3

A water-absorbing film was formed on both sides of a glass (BK7) substrate in the same manner as in Example 2-1. At this time, the optical thickness of the water-absorbing film was adjusted to 135 μm.

The performance characteristics of the anti-fogging coatings obtained in Experiments 1 to 3 are shown in Table 2.

As apparent from Table 2, the anti-fogging coating obtained in Experiment 1 satisfied the predetermined tests for the anti-reflection properties, anti-fogging properties and staining on the film. The anti-fogging coating obtained in Experiment 2 satisfied the tests for the anti-reflection properties and anti-fogging properties. In the test for staining on the film, however, residue of water remained in the $ZrO_2$ and $MgF_2$ films and at the interface therebetween, so that staining on the film occurred. The anti-fogging coating obtained in Experiment 3 satisfied the tests for the anti-reflection properties and staining on the film. In the test for anti-fogging properties, however, fogging occurred.

pressure. The $ZrO_2$ film had a refractive index of 1.68 and a packing rate of 65%.

A second water-absorbing film was then formed on each of the porous films in the same manner as in the first water-absorbing film. At this time, the optical thickness of the second water-absorbing film was adjusted to 135 nm.

The thus-prepared samples according to Experiments 1 to 4 were subjected to the following two tests.

1. Test for Anti-Fogging Properties:

A sample was removed from an environment of 5° C. into an environment of 30° C. and 80% HR to observe whether fogging occurred or not (ranking as A where no fogging occurred, or C where fogging occurred).

2. Variation of Film Upon Water Absorption:

A sample was immersed for 1 minute in water to observe whether some film showed a variation or not (ranking as A where a variation of transmittance before and after the immersion in water was lower than 2%, or C where the variation of transmittance was not lower than 2%.).

In the case where the first water-absorbing film was 25 μm (Experiment 4), a change in shape upon water absorption was great, and so a transmittance variation of about 2% was observed before and after the water absorption test.

TABLE 3

(Experiments in Example 3-5)

| | Thickness of first water-absorbing film (μm) | Anti-fogging properties | Variation of film upon water absorption |
|---|---|---|---|
| Exp. 1 | 10 | A | A |
| Exp. 2 | 1 | A | A |
| Exp. 3 | 20 | A | A |
| Exp. 4 | 25 | A | C |

TABLE 2

| | Experiment 3 | Experiment 2 | Experiment 1 |
|---|---|---|---|
| Layer constitution | | Porous $MgF_2$ film (nd: 135 nm) | Water-absorbing film (nd: 135 nm) |
| | | Porous $ZrO_2$ film (30 nm) | Porous $ZrO_2$ film (30 nm) |
| | Water-absorbing film (nd: 135 nm) | Water-absorbing film (10 μm) | Water-absorbing film (10 μm) |
| | Substrate | Substrate | Substrate |
| Anti-reflection properties | A | A | A |
| Anti-fogging properties | C | A | A |
| Staining on film | A | C | A |

Anti-reflection property: A where at least 96% of light of 550 nm in wavelength was transmitted, or C where not so.
Anti-fogging property: A where no fogging occurred when removed from an environment of 5 C into an environment of 30° C. and 80% HR, or C where fogging occurred.
Staining on film: A where no staining on film occurred after immersed for 1 minute in water, or C where staining on film occurred.

EXAMPLE 3-5

Experiments 1 to 4

A first water-absorbing film was formed on both sides of a glass (BK7) substrate in the same manner as in Example 2-1. At this time, the thickness of the first water-absorbing film was adjusted to 10 μm in Experiment 1, to 1 μm in Experiment 2, to 20 μm in Experiment 3 and to 25 μm in Experiment 4.

A porous film composed of $ZrO_2$ was formed in a thickness of 30 nm on each of the first water-absorbing films by an EB process in an atmosphere of argon under reduced

EXAMPLE 3-6

Experiments 6 to 9

A first water-absorbing film was formed on both sides of a glass (BK7) substrate in the same manner as in Example 2-1. At this time, the thickness of the first water-absorbing film was adjusted to 10 μm in each experiment.

A porous film composed of $ZrO_2$ was formed in a thickness of 30 nm on each of the first water-absorbing films by an EB process in an atmosphere of argon under reduced pressure. The $ZrO_2$ film had a refractive index of 1.68 and a packing rate of 65%.

A second water-absorbing film was then formed on each of the porous films in the same manner as in the first water-absorbing film. At this time, the refractive indices of the second water-absorbing films were each 1.48, and their optical thicknesses were adjusted to 100 nm in Experiment 6, to 110 nm in Experiment 7, to 160 nm in Experiment 8 and to 180 μm in Experiment 9. The optical thickness of the second water-absorbing film in Experiment 1 of Example 3-5 was 135 nm.

The transmittances of the thus-prepared samples according to Experiments 6 to 9 and the sample according to Experiment 1 of Example 3-5 were measured to observe their wavelengths at which the maximum values thereof were shown. At this time, the design wavelength was preset to 550 nm.

The results are shown in Table 4. The wavelengths at which the maximum values of transmittance were shown were 400 nm (Experiment 6), 440 nm (Experiment 7), 640 nm (Experiment 8), 720 nm (Experiment 9) and 540 nm (Experiment 1). In Experiments 6 and 9, a deviation from the design wavelength exceeds 100 nm, so that the performance as an optical part was impaired.

TABLE 4

(Experiments in Example 3-6)

| | Refractive index n of second water-absorbing film | Thickness d of second water-absorbing film (μm) | Optical thickness nd of second water-absorbing film | Compatibility with design wavelength |
|---|---|---|---|---|
| Exp. 6 | 1.48 | 70 | 100 | C |
| Exp. 7 | 1.48 | 75 | 110 | AB |
| Exp. 8 | 1.48 | 110 | 160 | AB |
| Exp. 9 | 1.48 | 120 | 180 | C |
| Exp. 1 | 1.48 | 90 | 135 | A |

Compatibility with the design wavelength:
Evaluated by whether a wavelength at which the maximum value of transmittance was shown was within a range of 100 nm from the design wavelength or not, and ranked as A where it was sufficient from the viewpoint of performance, B where it was at a usable level, or C where it was not at a usable level.

EXAMPLE 3-7

Experiments 10 to 14

A first water-absorbing film was formed on both sides of a glass (BK7) substrate in the same manner as in Example 2-1. At this time, the thickness of the first water-absorbing film was adjusted to 10 μm in each experiment.

A porous film composed of $ZrO_2$ was formed in a thickness of 30 nm on each of the first water-absorbing films by an EB process in an atmosphere of argon under vaccum. At this time, the degree of vacuum was controlled to adjust the packing rate of film-forming material in each porous film. In this case, the relationships between the degree of vacuum and packing rate of film-forming material in the porous films were as follows:

Experiment 10:
 degree of vacuum: $9 \times 10^{-4}$ Torr and packing rate of film-forming material: 10%;

Experiment 11:
 degree of vacuum: $7 \times 10^{-4}$ Torr and packing rate of film-forming material: 20%;

Experiment 12:
 degree of vacuum: $5 \times 10^{-4}$ Torr and packing rate of film-forming material: 50%;

Experiment 13:
 degree of vacuum: $2 \times 10^{-4}$ Torr and packing rate of film-forming material: 80%; and Experiment 14:
 degree of vacuum: $5 \times 10^{-5}$ Torr and packing rate of film-forming material: 90%.

A second water-absorbing film was then formed on each of the porous films in the same manner as the first water-absorbing film. At this time, the optical thickness of the second water-absorbing film was adjusted to 135 nm.

The thus-prepared samples according to Experiments 10 to 14 were subjected to the following two tests.

1. Test for Film Strength:

A sample was reciprocatorily wiped 30 times with commercially available Silbon paper under a load of 500 g or 300 g. The film strength was ranked as A where no failure of film occurred even when the sample was wiped 30 times in a reciprocating manner under the load of 500 g, B where no failure of film occurred even when the sample was wiped 30 times in a reciprocating manner under the load of 300 g, or C where failure of film occurred when the sample was wiped 30 times in a reciprocating manner under the load of 300 g.

2. Test for Anti-Fogging Properties:

A sample was removed from an environment of 5° C. into an environment of 30° C. nd 80% HR to observe whether fogging occurred or not. The anti-fogging property was ranking as A where no fogging occurred, or C where fogging occurred.

The results are shown in Table 5. In the case where the packing rate of film-forming material was 10% (Experiment 10), failure of film was observed in the test of wiping 30 times in a reciprocating manner under the load of 300 g.

In the case where the packing rate of film-forming material was 90% (Experiment 14), water could not penetrate into the porous film, so that fogging occurred in the test for anti-fogging properties.

TABLE 5

(Experiments in Example 3-7)

| | Degree of vacuum (Torr) | Packing rate of $ZrO_2$ film (%) | Film strength | Anti-fogging properties |
|---|---|---|---|---|
| Exp. 10 | $9 \times 10^{-4}$ | 10 | C | A |
| Exp. 11 | $7 \times 10^{-4}$ | 20 | AB | A |
| Exp. 12 | $5 \times 10^{-4}$ | 50 | A | A |
| Exp. 13 | $2 \times 10^{-4}$ | 80 | A | AB |
| Exp. 14 | $5 \times 10^{-5}$ | 90 | A | C |

While the present invention has been described with respect to what is presently considered to be the preferred embodiments, it is to be understood that the invention is not limited to the disclosed embodiments. To the contrary, the invention is intended to cover various modifications and equivalent arrangements embraced within the spirit and scope of the appended claims. The scope of the following claims is to be accorded the broadest interpretation so as to encompass all such modifications and equivalent structures and functions.

What is claimed is:

1. An anti-fogging coating formed on the surface of an optical substrate, wherein the anti-fogging coating comprises a water-absorbing film and an upper film in the order near to the surface of the substrate, said upper film having a packing rate of film-forming material from 20 to 80%, and increasing in its refractive index with the increase of the packing rate.

2. The anti-fogging coating according to claim 1, wherein the water-absorbing film comprises a water-absorbing polymer.

3. The anti-fogging coating according to claim 2, wherein the water-absorbing polymer is at least one selected from the group consisting of polyacrylics and polyvinyl alcohol.

4. The anti-fogging coating according to claim 2, wherein the water-absorbing polymer is obtained by conducting a polycondensation reaction of a hydrolyzate of an inorganic alkoxide in the presence of at least a polyacrylic.

5. The anti-fogging coating according to claim 1, wherein the upper film is an inorganic film formed by a vacuum process.

6. The anti-fogging coating according to claim 1, wherein the upper film is formed by a material selected from the group consisting of SiO, TiO, $CeO_2$, $SiO_2$, $TiO_2$, $ZrO_2$, $Ta_2O_5$ and $MgF_2$.

7. The anti-fogging coating according to claim 1, wherein the upper film is formed by a material selected from the group consisting of $SiO_2$, $TiO_2$, $ZrO_2$, $Ta_2O_5$ and $MgF_2$.

8. The anti-fogging coating according to claim 1, wherein the upper film is composed of 2 films.

9. The anti-fogging coating according to claim 8, wherein an upper film far from the water-absorbing film is more hydrophilic than an upper film near the water-absorbing film.

10. The anti-fogging coating according to claim 1, further comprising a second water-absorbing film on the upper film.

11. The anti-fogging coating according to claim 1, wherein the upper film is composed of one film, and its refractive index is 1.4 or lower.

12. The anti-fogging coating according to claim 1, wherein the upper film is composed of two films, and the refractive index of an upper film near the water-absorbing film is higher than that of an upper film far from the water-absorbing film.

13. The anti-fogging coating according to claim 12, wherein the upper film having the higher refractive index is a $ZrO_2$ film, and the upper film having the lower refractive index is a $MgF_2$ film.

14. The anti-fogging coating according to claim 1, wherein when the upper film is composed of one film, the optical thickness $(n_1 d_1)$ thereof is within a range of $$0.8 \times k\lambda/4 \leq n_1 d_1 \leq 1.2 \times k\lambda/4$$

wherein k is a positive odd number, $\lambda$ is a design wavelength selected from the range of 400 to 900 nm, $n_1$ is a refractive index of the upper film, and $d_1$ is a thickness of the upper film in nanometers, the anti-fogging coating so defined providing an anti-reflection effect.

15. The anti-fogging coating according to claim 1, wherein when the upper film is composed of two or more films, the optical thickness $(n_2 d_2)$ of an upper film farthest (i.e., outermost) from the water-absorbing film is within a range of $$0.8 \times k\lambda/4 \leq n_2 d_2 \leq 1.2 \times k\lambda/4$$

wherein k is a positive odd number, $\lambda$ is a design wavelength selected from the range of 400 to 900 nm, $n_2$ is a refractive index of the outermost upper film, and $d_2$ is a thickness of the outermost upper film in nanometers, the anti-fogging coating so defined providing an anti-reflection effect.

16. The anti-fogging coating according to claim 1, wherein when the upper film is composed of two or more films, and an upper film farthest (i.e., outermost) from the water-absorbing film has an optically negligible thickness, the optical thickness $(n_3 d_3)$ of an upper film next to the outermost porous film is within a range of $$0.8 \times k\lambda/4 \leq n_3 d_3 \leq 1.2 \times k\lambda/4$$

wherein k is a positive odd number, $\lambda$ is a design wavelength selected from the range of 400 to 900 nm, $n_3$ is a refractive index of the next upper film, and $d_3$ is a thickness of the next upper film in nanometers, the anti-fogging coating so defined providing an anti-reflection effect.

17. The anti-fogging coating according to claim 1, which comprises a first water-absorbing film, the upper film and a second water-absorbing film in the order near to the surface of the substrate, the refractive index of the upper film is equal to or higher than that of the first water-absorbing film, and the thickness of the first water-absorbing film is within a range from 1 to 20 $\mu$m.

18. The anti-fogging coating according to claim 17, wherein the refractive index of the second water-absorbing film is lower than that of the upper film, and the optical thickness $(n_4 d_4)$ of the second water-absorbing film is within a range of $$0.8 \times k\lambda/4 \leq n_4 d_4 \leq 1.2 \times k\lambda/4$$

wherein k is a positive odd number, $\lambda$ is a design wavelength selected from the range of 400 to 900 nm, $n_4$ is a refractive index of the second water-absorbing film, and $d_4$ is a thickness of the second water-absorbing film in nanometers, the anti-fogging coating so defined providing an anti-reflection effect.

19. An optical part having an anti-fogging coating on the surface of an optical substrate, wherein the anti-fogging coating comprises a water-absorbing film and an upper film in the order near to the surface of the substrate, said upper film having a packing rate of film-forming material from 20 to 80%, and increasing in its refractive index with the increase of the packing rate.

20. The optical part according to claim 19, wherein the upper film is an inorganic film formed by a vacuum process.

21. The optical part according to claim 20, wherein the optical substrate is selected from the group consisting of lenses, prisms, cover glass, filters and mirrors.

* * * * *

UNITED STATES PATENT AND TRADEMARK OFFICE
CERTIFICATE OF CORRECTION

PATENT NO.    : 6,287,683 B1
DATED         : September 11, 2001
INVENTOR(S)   : Susumu Itoh et al.

It is certified that error appears in the above-identified patent and that said Letters Patent is hereby corrected as shown below:

<u>Column 2,</u>
Line 1, "tends" should read -- tend --.

<u>Column 9,</u>
Line 67, "parts" should read -- part --.

Signed and Sealed this

Second Day of April, 2002

*Attest:*

JAMES E. ROGAN
*Attesting Officer*   *Director of the United States Patent and Trademark Office*